United States Patent
Li

(10) Patent No.: US 10,127,037 B2
(45) Date of Patent: Nov. 13, 2018

(54) METHOD FOR RECOGNIZING APPLICATION TYPE

(71) Applicant: Beijing Pico Technology Co., Ltd., Hai Dian District (CN)

(72) Inventor: Ligang Li, Hai Dian District (CN)

(73) Assignee: Beijing Pico Technology Co., Ltd., Hai Dian District (CN)

( * ) Notice: Subject to any disclaimer, the term of this patent is extended or adjusted under 35 U.S.C. 154(b) by 38 days.

(21) Appl. No.: 15/363,803

(22) Filed: Nov. 29, 2016

(65) Prior Publication Data

US 2017/0351510 A1    Dec. 7, 2017

(51) Int. Cl.
*G06F 9/44*    (2018.01)
*G06F 8/71*    (2018.01)
*G06F 17/30*    (2006.01)

(52) U.S. Cl.
CPC .......... *G06F 8/71* (2013.01); *G06F 17/30106* (2013.01)

(58) Field of Classification Search
CPC ....................................................... G06F 8/71
USPC ....................................................... 717/121
See application file for complete search history.

(56) References Cited

U.S. PATENT DOCUMENTS

| | | | | |
|---|---|---|---|---|
| 9,152,694 | B1* | 10/2015 | Padidar | G06F 17/30598 |
| 2006/0085754 | A1* | 4/2006 | Li | G06F 9/4443 |
| | | | | 715/763 |
| 2008/0109871 | A1* | 5/2008 | Jacobs | H04L 63/20 |
| | | | | 726/1 |
| 2013/0183951 | A1* | 7/2013 | Chien | H04W 4/001 |
| | | | | 455/418 |
| 2014/0063074 | A1* | 3/2014 | Drzaic | G09G 3/30 |
| | | | | 345/690 |

* cited by examiner

*Primary Examiner* — Wei Y Zhen
*Assistant Examiner* — Lanny N Ung
(74) *Attorney, Agent, or Firm* — LKGlobal | Lorenz & Kopf, LLP

(57) ABSTRACT

A method for recognizing an application type, includes, but is not limited to, judging whether an application in a system has an application type mark. If so, acquiring a value of the application type mark of the application, and comparing the value of the application type mark with a preset value of each application type to recognize a type of the application. The application type mark refers to metadata that can indicate the type of the application that was added into a list configuration file of the application when the application was being developed. If not, acquiring an application package name of the application, and recognizing the type of the application according to the application package name. By applying the mark, the system can automatically judge whether the current application is a Virtual Reality (VR) application or an ordinary 2D application, thereby performing appropriate output processing, and brining better user experience.

8 Claims, 3 Drawing Sheets

METHOD FOR RECOGNIZING APPLICATION TYPE

CROSS-REFERENCE TO RELATED APPLICATION

This application claims the benefit and priority of Chinese Patent Application No. 201610403661.8 filed Jun. 7, 2016. The entire disclosure of the above application is hereby incorporated herein by reference.

TECHNICAL FIELD

This application pertains to the technical field of virtual reality, and particularly, to a method for recognizing an application type.

BACKGROUND

In recent years, the Virtual Reality (VR) technology gradually becomes mature, and various virtual reality devices are being developed. In those, the virtual reality devices represented by Cardboard use a cellular phone as the main component, and an ordinary cellular phone can be converted into a virtual reality device just by providing a fixing structure composed of two lenses and some cheap materials, which greatly reduces the cost of virtual reality devices, and promotes the population of virtual reality devices. In addition, many manufacturers also use Android to develop their own virtual reality all-in-one machines.

However, Android based virtual reality devices and virtual reality all-in-one machines both face a problem that an ordinary 2D application and a VR application may simultaneously exist in the system. The modes for processing the two types of applications are different from each other, but in the prior art, the virtual reality devices cannot automatically recognize the application type, thus a 2D application may be started up under a VR mode, or a VR application may be processed as a 2D application, and the user experience is poor. Therefore, there is a need for a solution for automatically recognizing the application type in the system.

In addition, other objects, desirable features and characteristics will become apparent from the subsequent summary and detailed description, and the appended claims, taken in conjunction with the accompanying drawings and this background.

SUMMARY OF THE DISCLOSURE

The present disclosure provides a method for recognizing an application type, which solves the problem that in the prior art, the virtual reality devices cannot automatically recognize the application type, thus a 2D application may be started up under a VR mode, or a VR application may be processed as a 2D application, and the user experience is poor.

In order to achieve the above objective, the technical solutions of the present disclosure are realized as follows.

The present disclosure provides a method for recognizing an application type, comprising:

judging whether an application to be recognized in a system has an application type mark;

if so, acquiring a value of the application type mark of the application to be recognized, and comparing the value of the application type mark with a preset value of each of application types to recognize a type of the application to be recognized, wherein the application type mark refers to metadata that can indicate the type of the application that was added into a list configuration file of the application when the application was being developed;

if not, acquiring an application package name of the application to be recognized, and recognizing the type of the application to be recognized according to the application package name.

Optionally, the acquiring a value of the application type mark of the application to be recognized comprises:

judging whether a view of the application to be recognized is an ordinary view or a special view, in case of an ordinary view, reading metadata in the list configuration file of the application to be recognized by calling function addView( ) of class WindowManagerGlobal.java of the system, taking a value of the metadata as the value of the application type mark of the application to be recognized, and saving the value of the application type mark in class WindowManager.LayoutParams;

in case of a special view, reading metadata in the list configuration file of the application to be recognized by directly calling function init( ) of the special view, taking a value of the metadata as the value of the application type mark of the application to be recognized, and saving the value of the application type mark in class WindowManager.LayoutParams.

Optionally, the data types of the application type mark comprise character string type, Boolean type and numeric type, and the comparing the value of the application type mark with a preset value of each of application types to recognize a type of the application to be recognized comprises:

acquiring the value of the application type mark according to the data type of the application type mark, and comparing the value of the application type mark with a preset value of each of application types of corresponding data type; and if the value of the application type mark is consistent with a preset value of a certain application type, determining that the application type of the application to be recognized is an application type corresponding to the preset value.

Optionally, the acquiring an application package name of the application to be recognized, and recognizing the type of the application to be recognized according to the application package name comprises:

acquiring an application package name of the application to be recognized, and comparing the application package name of the application to be recognized with an application white list that is pre-stored in the system, the application white list containing an application package name of at least one known application type; and if the application package name of the application to be recognized matches an application package name in the application white list, determining that the type of the application to be recognized is the application type corresponding to the matched application package name.

Optionally, the application white list comprises:

a 2D application white list containing an application package name of at least one 2D application type, and a Virtual Reality (VR) application white list containing an application package name of at least one VR application type.

Optionally, the method further comprises: acquiring update information of the application white list from a server periodically, and updating the application white list in the system by using the update information of the application white list.

Optionally, the method further comprises:

sending information of the recognized application type of the application to be recognized to an application view rendering management service of the system, so that the application view rendering management service renders and outputs a corresponding display view according to the type of the application.

In addition, the embodiments of the present disclosure further provide a method for recognizing an application type, comprising:

acquiring an application package name of an application to be recognized in a system, and matching the application package name of the application to be recognized with an application white list that is pre-stored in the system, the application white list containing an application package name of at least one known application type;

if the application package name of the application to be recognized matches an application package name in the application white list, determining that a type of the application to be recognized is the application type corresponding to the matched application package name;

if the application package name of the application to be recognized does not match any application package name in the application white list, further judging whether the application to be recognized has an application type mark; and if the application to be recognized has an application type mark, acquiring a value of the application type mark, and recognizing the type of the application to be recognized according to the value of the application type mark;

wherein the application type mark refers to metadata that can indicate the type of the application that was added into a list configuration file of the application when the application was being developed.

Optionally, the acquiring a value of the application type mark comprises:

judging whether a view of the application to be recognized is an ordinary view or a special view, in case of an ordinary view, reading metadata in the list configuration file of the application to be recognized by calling function addView( ) of class WindowManagerGlobal.java of the system, taking a value of the metadata as the value of the application type mark of the application to be recognized, and saving the value of the application type mark in class WindowManager.LayoutParams; and in case of a special view, reading metadata in the list configuration file of the application to be recognized by directly calling function init( ) of the special view, taking a value of the metadata as the value of the application type mark of the application to be recognized, and saving the value of the application type mark in class WindowManager.LayoutParams; and the recognizing the type of the application to be recognized according to the value of the application type mark comprises:

comparing the value of the application type mark with a preset value of each of application types to recognize the type of the application to be recognized.

Optionally, the data types of the application type mark comprise character string type, Boolean type and numeric type, and the comparing the value of the application type mark with a preset value of each of application types to recognize the type of the application to be recognized comprises:

acquiring the value of the application type mark according to a data type of the application type mark, and comparing the value of the application type mark with a preset value of each of application types of corresponding data type; and if the value of the application type mark is consistent with a preset value of a certain application type, determining that the application type of the application to be recognized is an application type corresponding to the preset value.

The present disclosure achieves the following beneficial effects: on one hand, according to the first method for recognizing an application type in the present disclosure, the application type can be automatically recognized by determining the application type mark of the application. On the other hand, according to the second method for recognizing an application type in the present disclosure, the application type can be automatically recognized by determining the package name of the application. During actual applications, either of the two methods for recognizing an application type in the embodiments can be selected according to the actual demands to recognize an application type. Therefore, after the application type is acquired, a virtual reality device that does not support running a 2D application under a VR mode is prevented from starting up an ordinary 2D application under the VR mode, and a virtual reality device that supports running a 2D application under the VR mode is prevented from processing a VR application as an ordinary 2D application, thereby greatly improving the user experience.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The designed concept of the present disclosure is to provide a method for automatically recognizing an application type, with respect to the problem in the prior art that the virtual reality devices that support both 2D applications and VR applications cannot recognize the application type, and thus an ordinary 2D application is run under a VR mode, or a VR application is processed as an ordinary 2D application, and the user experience is poor. Through the method of the embodiments, the virtual reality devices can automatically recognize whether the currently run application is an ordinary 2D application or a VR application, so as to employ appropriate processing and output mode, and improve the user experience and the product competitiveness.

To be noted, although the embodiments are described by taking the VR application and the 2D application as two major application types, the application types that can be recognized by the technical solutions of the present disclosure are not limited thereto, and any modification and adjustment may be made according to the actual application requirements. The VR application is dedicated to the using of virtual reality devices, and it is one type of 3D applications.

Figure 1:
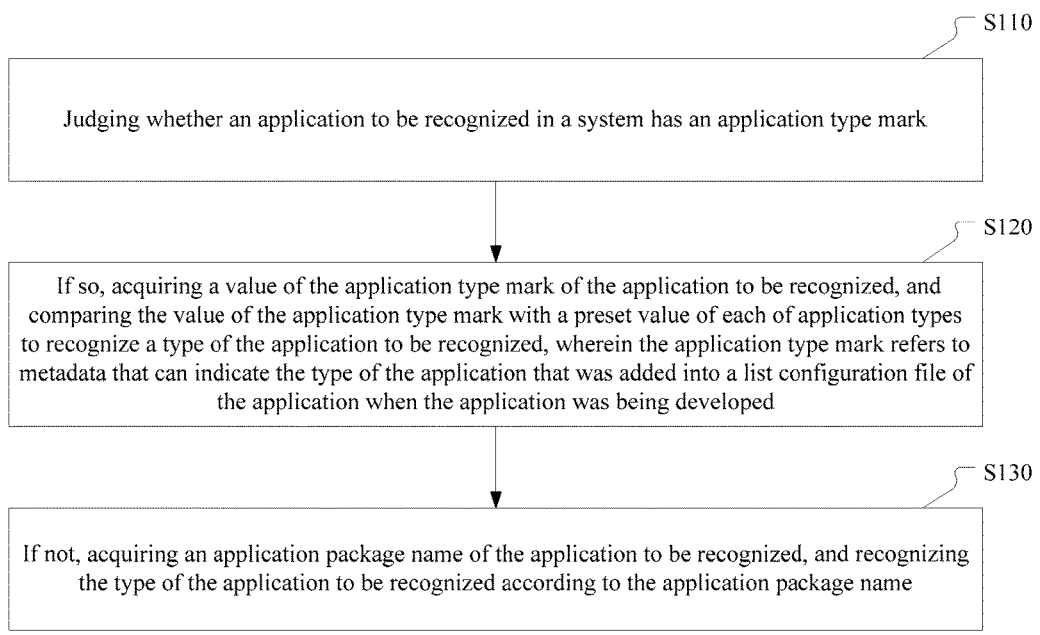
FIG. 1 is a flow diagram of a method for recognizing an application type in one non-limiting embodiment of the present disclosure.

FIG. 1 is a flow diagram of a method for recognizing an application type in one embodiment of the present disclosure. Referring to FIG. 1, the method for recognizing an application type comprises:

Step S110: judging whether an application to be recognized in a system has an application type mark;

Step S120: if so, acquiring a value of the application type mark of the application to be recognized, and comparing the value of the application type mark with a preset value of each of application types to recognize a type of the application to be recognized, wherein the application type mark refers to metadata that can indicate the type of the application that was added into a list configuration file of the application when the application was being developed;

Step S130: if not, acquiring an application package name of the application to be recognized, and recognizing the type of the application to be recognized according to the application package name.

As can be seen from the method as illustrated in FIG. 1, it is judged whether an application to be recognized has an application type mark; if so, the value of the application type mark is compared with the preset value of each of application types to determine the application type of the application to be recognized; and if not, the type of the application to be recognized can be determined according to the package name of the application to be recognized. Thus, for different applications, the embodiments of the present disclosure provide corresponding means for recognizing the application type, so as to automatically judge whether the currently loaded application is a VR application or an ordinary 2D application, and then employ an appropriate processing mode depending on the application type, thereby bringing a better user experience and improving the product competitiveness.

Next, the detailed steps for implementing the method for recognizing an application type in the present disclosure will be specifically described through an example of recognizing the application type of a newly developed Android application.

To be noted, in order to automatically recognize the application type (e.g., 2D application/VR application), during the application development of the embodiments, a metadata MetaData named as "com.xxx.stereo" is added into the file AndroidManifest.xml of the application. The metadata is the application type mark.

Figure 2:
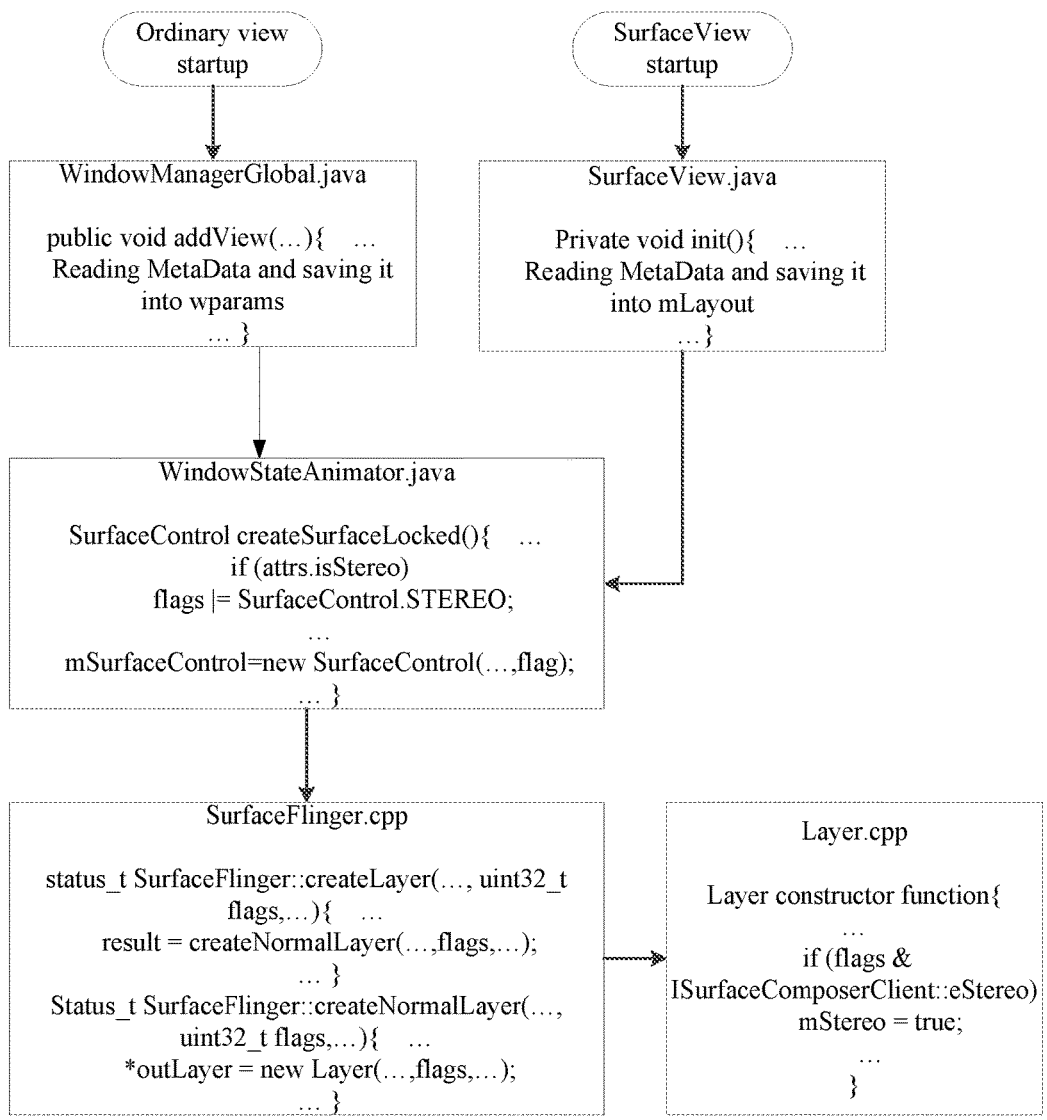
FIG. 2 is a schematic diagram of reading an application type mark in one non-limiting embodiment of the present disclosure.

FIG. 2 is a schematic diagram of reading an application type mark in one embodiment of the present disclosure. Referring to FIG. 2, during the startup of the application, the system reads the value of the application type mark and compares the value of the application type mark with a preset value of each known application type, so as to determine the current application type.

Herein, the reading the value of the application type mark of the application to be recognized comprises:

judging whether a view of the application to be recognized is an ordinary view or a special view; in case of an ordinary view, reading metadata in the list configuration file of the application to be recognized by calling function addView( ) of class WindowManagerGlobal.java of the system, taking a value of the metadata as the value of the application type mark of the application to be recognized, and saving the value of the application type mark in class WindowManager.LayoutParams; and in case of a special view, reading metadata in the list configuration file of the application to be recognized by directly calling function init( ) of the special view, taking a value of the metadata as the value of the application type mark of the application to be recognized, and saving the value of the application type mark in class WindowManager.LayoutParams.

Referring to FIG. 2, during the application development, if the view of the newly developed application is an ordinary view, the information of the application type mark is read by adding a segment of codes into the function addView( ) of WindowManagerGlobal.java, and then saved by adding a variable isStereo into WindowManager.LayoutParams.

In addition, if the view of the newly developed application is a special view (SurfaceView), the MetaData can be directly read through the function init( ) of the SurfaceView since the SurfaceView does not pass through the function addView( ) of WindowMangerGlobal.java, and then the application type mark is saved in WindowManager.LayoutParams, similarly.

Virtual reality devices achieve the compatibility with 2D applications by modifying the service SurfaceFlinger of the system. Thus in this embodiment, the method can send information of the recognized application type of the application to be recognized to an application view rendering management service of the system, so that the application view rendering management service renders and outputs a corresponding display view according to the type of the application. That is, the information of the application type is transmitted to the service SurfaceFlinger, so that the SurfaceFlinger can judge whether each layer is a 2D application or a VR application, and then take corresponding display output mode depending on the application type.

Referring to FIG. 2, specifically, the information of the application type mark is attached to the flag parameter of new SurfaceControl( ) in the function createSurface Locked( ) of WindowStateAnimator.java, and through the calling of the above function, the information of the application type mark is finally transferred to the function createLayer( ) of SurfaceFlinger.cpp, and acquired by a constructor function of the Layer. In the end, during the application development, an mStereo member variable may be added into the Layer to save the information of the application type mark, and a function isStereo( ) may be added for external queries.

In this embodiment, the data types of the application type mark (i.e., MetaData) include: character string type, Boolean type and numeric type. When an application type is actually to be determined, the method should comprise acquiring the value of the application type mark according to the data type of the application type mark, and comparing the value of the application type mark with a preset value of each of application types of corresponding data type; and if the value of the application type mark is consistent with a preset value of a certain application type, determining that the application type of the application to be recognized is the application type corresponding to the preset value.

For example, the data type of the metadata may be set as the character string type, and the value of the metadata of the application that is read by the system may be set as the character string "2Dyignyong". Next, the value of the metadata, i.e., "2Dyignyong", is compared with a preset value (e.g., the character string "2Dyignyong") of the known application type, so as to recognize that the current application is an ordinary 2D application.

Alternatively, the data type of the metadata may be set as the Boolean type and the value is real, and a preset value corresponding to the ordinary 2D application in the system may be set as also real. Thus it can be determined that the current application is an ordinary 2D application.

The process of recognizing an application type by using an application type mark provided in a list configuration file of the application is introduced as above. In addition, this embodiment further provides an implementation for recognizing an application type by using a white list and an application package name, which will be subsequently described in details.

With respect to the applications that have been installed in existing virtual reality devices, it is relatively complex to implement a solution that adds an application type mark by modifying the list configuration files of the applications. In view of that problem, this embodiment provides a simple implantation that recognizes an application type by using an application package name.

In this implantation, an application white list should be maintained in the Android system. Specifically, the application white list may include: a 2D application white list containing an application package name of at least one 2D application type, and a virtual reality (VR) application white list containing an application package name of at least one VR application type.

After an application to be recognized is started up, the system firstly acquires an application package name of the application, and compares the application package name of the application to be recognized with an application white list that is pre-stored in the system; and if the application package name of the application to be recognized matches an application package name in the application white list, determines that the type of the application to be recognized is the application type corresponding to the matched application package name. Since the package name (Package Name) of Android software is a unique ID of the application program in the Android system, this embodiment prebuilds a white list containing the application package names of known application types. If the current application matches an application package name in the white list, that means that the type of the current application is the type that is corresponding to the application package name in the white list.

For example, the system maintains a VR application white list containing the package names of some common VR applications that is acquired through a statistic summarization. After an application to be recognized is started up, the package name of the application is acquired and compared with each package name in the VR application white list, and if a package name is matched with it, it is determined that the application type of the current application to be recognized is a VR application.

In order to further improve the accuracy of the recognizing method, in this embodiment, the Android system can also acquire update information of the application white list from a server periodically, and update the application white list in the system by using the update information of the application white list.

Figure 3:
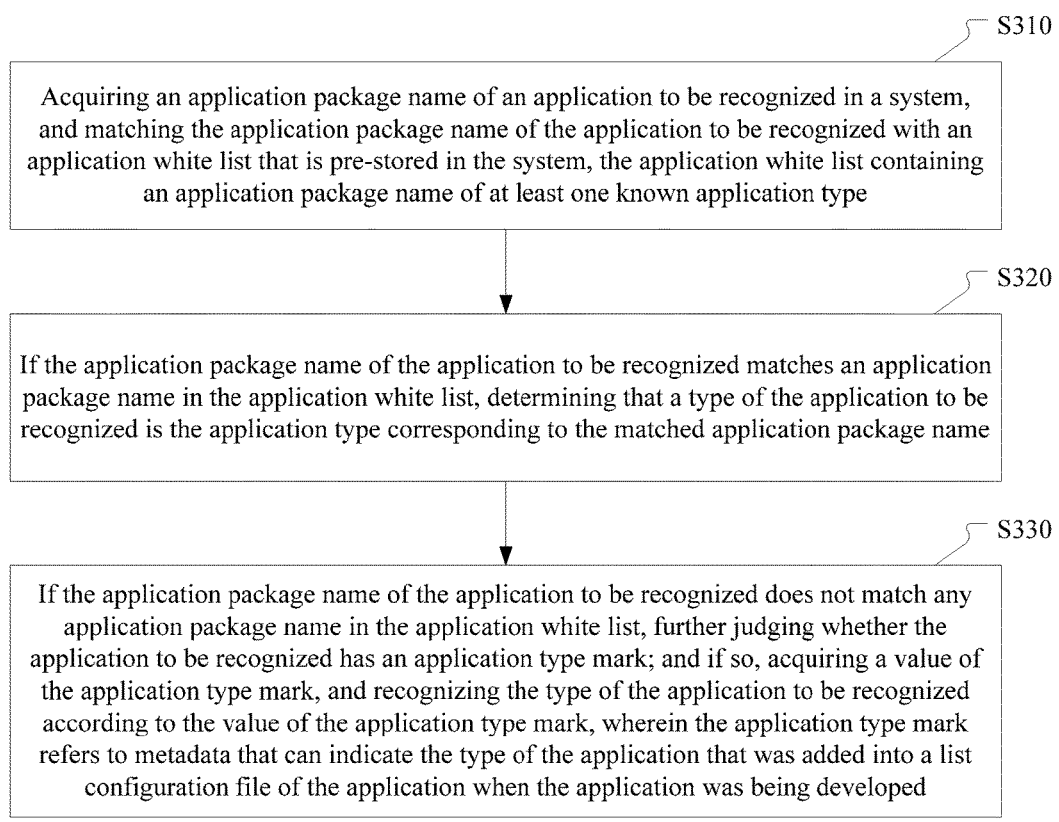
FIG. 3 is a flow diagram of a method for recognizing an application type in one non-limiting embodiment of the present disclosure.

FIG. 3 is a flow diagram of a method for recognizing an application type in one embodiment of the present disclosure. Referring to FIG. 3, the method comprises:

Step S310: acquiring an application package name of an application to be recognized in a system, and matching the application package name of the application to be recognized with an application white list that is pre-stored in the system, the application white list containing an application package name of at least one known application type;

Step S320: if the application package name of the application to be recognized matches an application package name in the application white list, determining that a type of the application to be recognized is the application type corresponding to the matched application package name;

Step S330: if the application package name of the application to be recognized does not match any application package name in the application white list, further judging whether the application to be recognized has an application type mark; and if the application to be recognized has an application type mark, acquiring a value of the application type mark, and recognizing the type of the application to be recognized according to the value of the application type mark, wherein the application type mark refers to metadata that can indicate the type of the application that was added into a list configuration file of the application when the application was being developed.

The acquiring a value of the application type mark in Step S330 comprises: judging whether a view of the application to be recognized is an ordinary view or a special view, in case of an ordinary view, reading metadata in the list configuration file of the application to be recognized by calling function addView( ) of class WindowManagerGlobal.java of the system, taking a value of the metadata as the value of the application type mark of the application to be recognized, and saving the value of the application type mark in class WindowManager.LayoutParams; and in case of a special view, reading metadata in the list configuration file of the application to be recognized by directly calling function init( ) of the special view, taking a value of the metadata as the value of the application type mark of the application to be recognized, and saving the value of the application type mark in class WindowManager.LayoutParams.

The recognizing the type of the application to be recognized according to the value of the application type mark in Step S330 comprises:

comparing the value of the application type mark with a preset value of each of application types to recognize the type of the application to be recognized.

In this embodiment, the data types of the application type mark comprise: character string type, Boolean type and numeric type. The comparing the value of the application type mark with a preset value of each of application types to recognize the type of the application to be recognized comprises: acquiring the value of the application type mark according to a data type of the application type mark, and comparing the value of the application type mark with a preset value of each of application types of corresponding data type; and if the value of the application type mark is consistent with a preset value of a certain application type, determining that the application type of the application to be recognized is an application type corresponding to the preset value.

To be noted, the method for recognizing an application type as illustrated in FIG. 3 differs from the method for recognizing an application type as illustrated in FIG. 1 mainly in that the orders of acquiring the application type mark and acquiring the application package name are different, and the specific judging processes are substantially the same. Thus please refer to the description of the method as illustrated in FIG. 1 for those not described in the method as illustrated in FIG. 3, which are omitted here.

In addition, generally it is simple to implement the recognizing method that directly acquires the application package name, and the recognizing efficiency is high. Relatively, the recognizing method that reads the application type mark achieves a more reliable recognition result. Thus in practice, they can be selected according to the actual demands, which is not limited herein.

In conclusion, the method for recognizing an application type in the present disclosure judges whether an application has an application type mark; if the application has an application type mark, directly judges the application type according to the value of the application type mark; and if the application does not have an application type mark, judges the application type according to the application package name, thereby automatically recognizing the application type for different applications. Thus, after the application type is acquired, a virtual reality device that does not support running a 2D application under a VR mode is prevented from starting up an ordinary 2D application under the VR mode, and a virtual reality device that supports running a 2D application under the VR mode is prevented from processing a VR application as an ordinary 2D application, thereby greatly improving the user experience and the product competitiveness.

The above descriptions are just preferred embodiments of the present disclosure, rather than limitations to the protection scope of the present disclosure. Any amendment, equivalent replacement, improvement, etc. made within the spirit and principle of the present disclosure shall fall within the protection scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A method for recognizing an application type, comprising:
    judging whether an application to be recognized in a system has an application type mark;
    if so, acquiring a value of the application type mark of the application to be recognized, and comparing the value of the application type mark with a preset value of each of application types to recognize a type of the application to be recognized, wherein the application type mark refers to metadata that can indicate the type of the application that was added into a list configuration file of the application when the application was being developed;
    if not, acquiring an application package name of the application to be recognized, and recognizing the type of the application to be recognized according to the application package name,
    wherein the acquiring a value of the application type mark of the application to be recognized comprises:
    judging whether a view of the application to be recognized is an ordinary view or a special view,
    in case of an ordinary view, reading metadata in the list configuration file of the application to be recognized by calling function addView( ) of class WindowManagerGlobal.java of the system, taking a value of the metadata as the value of the application type mark of the application to be recognized, and saving the value of the application type mark in class WindowManager.LayoutParams;
    in case of a special view, reading metadata in the list configuration file of the application to be recognized by directly calling function init( ) of the special view, taking a value of the metadata as the value of the application type mark of the application to be recognized, and saving the value of the application type mark in class WindowManager.LayoutParams.

2. The method according to claim 1, wherein data types of the application type mark comprise character string type, Boolean type and numeric type, and
    the comparing the value of the application type mark with a preset value of each of application types to recognize a type of the application to be recognized comprises:
    acquiring the value of the application type mark according to the data type of the application type mark, and comparing the value of the application type mark with a preset value of each of application types of corresponding data type; and if the value of the application type mark is consistent with a preset value of a certain application type, determining that the application type of the application to be recognized is an application type corresponding to the preset value.

3. The method according to claim 1, wherein the acquiring an application package name of the application to be recognized, and recognizing the type of the application to be recognized according to the application package name comprises:
    acquiring an application package name of the application to be recognized, and comparing the application package name of the application to be recognized with an application white list that is pre-stored in the system, the application white list containing an application package name of at least one known application type; and
    if the application package name of the application to be recognized matches an application package name in the application white list, determining that the type of the application to be recognized is the application type corresponding to the matched application package name.

4. The method according to claim 3, wherein the application white list comprises:
    a 2D application white list containing an application package name of at least one 2D application type, and
    a Virtual Reality (VR) application white list containing an application package name of at least one VR application type.

5. The method according to claim 3, further comprising:
    acquiring update information of the application white list from a server periodically, and updating the application white list in the system by using the update information of the application white list.

6. The method according to claim 1, further comprising:
    sending information of the recognized application type of the application to be recognized to an application view rendering management service of the system, so that the application view rendering management service renders and outputs a corresponding display view according to the type of the application.

7. A method for recognizing an application type, comprising:
    acquiring an application package name of an application to be recognized in a system, and matching the application package name of the application to be recognized with an application white list that is pre-stored in the system, the application white list containing an application package name of at least one known application type;

if the application package name of the application to be recognized matches an application package name in the application white list, determining that a type of the application to be recognized is the application type corresponding to the matched application package name; and if the application package name of the application to be recognized does not match any application package name in the application white list, further judging whether the application to be recognized has an application type mark; and if the application to be recognized has an application type mark, acquiring a value of the application type mark, and recognizing the type of the application to be recognized according to the value of the application type mark;

wherein the application type mark refers to metadata that can indicate the type of the application that was added into a list configuration file of the application when the application was being developed, wherein the acquiring a value of the application type mark comprises:

judging whether a view of the application to be recognized is an ordinary view or a special view, in case of an ordinary view, reading metadata in the list configuration file of the application to be recognized by calling function addView( ) of class WindowManagerGlobal.java of the system, taking a value of the metadata as the value of the application type mark of the application to be recognized, and saving the value of the application type mark in class WindowManager.LayoutParams;

in case of a special view, reading metadata in the list configuration file of the application to be recognized by directly calling function init( ) of the special view, taking a value of the metadata as the value of the application type mark of the application to be recognized, and saving the value of the application type mark in class WindowManager.LayoutParams; and the recognizing the type of the application to be recognized according to the value of the application type mark comprises:

comparing the value of the application type mark with a preset value of each of application types to recognize the type of the application to be recognized.

8. The method according to claim 7, wherein the data types of the application type mark comprise character string type, Boolean type and numeric type, and the comparing the value of the application type mark with a preset value of each of application types to recognize the type of the application to be recognized comprises:

acquiring the value of the application type mark according to a data type of the application type mark, and comparing the value of the application type mark with a preset value of each of application types of corresponding data type; and if the value of the application type mark is consistent with a preset value of a certain application type, determining that the application type of the application to be recognized is an application type corresponding to the preset value.

* * * * *

UNITED STATES PATENT AND TRADEMARK OFFICE
CERTIFICATE OF CORRECTION

PATENT NO. : 10,127,037 B2
APPLICATION NO. : 15/363803
DATED : November 13, 2018
INVENTOR(S) : Ligang Li It is certified that error appears in the above-identified patent and that said Letters Patent is hereby corrected as shown below:

On the Title Page

Column 1, Please add the following item between item (65) and item (51):
--(30) Foreign Application Priority Data July 6, 2016 (CN).........................2016 1 0403661.8--

Signed and Sealed this
Twenty-second Day of October, 2019

Andrei Iancu
*Director of the United States Patent and Trademark Office*